United States Patent
Robinson et al.

(10) Patent No.: US 8,016,529 B2
(45) Date of Patent: Sep. 13, 2011

(54) SPRING CAPTIVE LOADED FASTENER RETAINER

(75) Inventors: Kristopher Scott Robinson, Atlanta, GA (US); Carey D. Harnois, Grayson, GA (US); James R. Tirrell, Palmyra, VA (US)

(73) Assignee: Siemens Industry, Inc., Alpharetta, GA (US)

( * ) Notice: Subject to any disclaimer, the term of this patent is extended or adjusted under 35 U.S.C. 154(b) by 344 days.

(21) Appl. No.: 12/176,761

(22) Filed: Jul. 21, 2008

(65) Prior Publication Data

US 2010/0014911 A1    Jan. 21, 2010

(51) Int. Cl.
*F16B 37/04*    (2006.01)
(52) U.S. Cl. ........................... 411/108; 411/347
(58) Field of Classification Search .......... 411/103–105, 411/108, 353, 111, 112, 347, 981, 985, 107; 403/296; 292/175
See application file for complete search history.

(56) References Cited

U.S. PATENT DOCUMENTS

| | | | |
|---|---|---|---|
| 3,986,544 A | 10/1976 | Jones et al. | |
| 4,031,935 A | 6/1977 | Jones et al. | |
| 4,616,967 A * | 10/1986 | Molina | 411/105 |
| 4,863,326 A * | 9/1989 | Vickers | 411/105 |
| 5,082,406 A * | 1/1992 | Cosenza | 411/105 |
| 5,743,670 A * | 4/1998 | Ader | 403/296 |
| 5,851,095 A * | 12/1998 | Ellis et al. | 411/353 |
| 6,095,736 A * | 8/2000 | Miller et al. | 411/352 |
| 6,238,155 B1 * | 5/2001 | Aukzemas et al. | 411/107 |
| 6,439,816 B1 * | 8/2002 | Nance et al. | 411/108 |
| 6,468,011 B2 * | 10/2002 | Mayer | 411/353 |
| 6,752,577 B2 * | 6/2004 | Chen et al. | 411/508 |
| 7,114,899 B2 * | 10/2006 | Gass et al. | 411/107 |
| 7,179,037 B2 * | 2/2007 | Aukzemas et al. | 411/353 |
| 7,198,306 B2 * | 4/2007 | Ambs | 292/175 |
| 7,686,553 B2 * | 3/2010 | Durfee, Jr. | 411/107 |

* cited by examiner

*Primary Examiner* — Gary Estremsky
(74) *Attorney, Agent, or Firm* — Jose R. de la Rosa

(57) ABSTRACT

A spring-loaded captive fastener retainer provides a user-friendly system to mechanically fasten units (e.g. panels, cabinets, etc.) to other units. Generally, the retainer is spring-loaded to force a fastener to extend beyond the unit. The retainer has a housing that provides guidance to the fastener so that it is secured within the unit and travels in a predictable path.

15 Claims, 5 Drawing Sheets

SPRING CAPTIVE LOADED FASTENER RETAINER

BACKGROUND OF THE INVENTION

The present invention relates generally to mechanical fasteners and more particularly to captive spring-loaded fastener retainers.

Fastening devices are used in a variety of industrial and electronic applications to assist users in equipment assembly. For example, electrical units (e.g., meter cabinets, bus bar terminal boxes, modular panelboards, etc.) must be fastened together and/or must be secured to a wall or other object. During an installation process, these electrical units are attached to each other with bolts, nuts, and/or other fasteners.

Conventionally, a fastener is fixed into the side (e.g., caused to protrude through a hole, etc.) of one unit before the unit is abutted with another unit. Alternatively, a loose fastener (e.g., an unrestrained bolt, etc) is inserted into a hole in one unit by a user during the installation process. These are user unfriendly processes as it is difficult to align and/or maintain the alignment of multiple units before they are joined. If the units are not well-aligned, the fastener may break or damage one or both units during installation. Additionally, the loose fastener could be pushed out of the unit during the installation process and be lost or delay the installation process.

To avoid these complications, retractable captive fasteners, such as those described in U.S. Pat. Nos. 3,986,544 and 4,031,395, are used. With captive fastening devices, the possibility of dropping a fastener and losing it in the interior of the unit is diminished. Existing fastening devices of this kind restrain one of the members (e.g., a bolt, etc.) by holding it captive in a structural unit, but the other member (e., a nut, etc.) of a two-part fastener is left free.

In some cases, the fastening device has both pieces of a two-part fastener captivated. One part (e.g., the bolt) is captively mounted by notching or slotting a portion (e.g., the bolt head) so that it may be slidably mounted on "rails." In this way, the bolt may move reciprocally in an axial direction but not rotationally relative to the assembly in which it is held. The other part (e.g. the nut) of the two-part fastener is mounted in such a way that it may move rotationally but not reciprocally with respect to the assembly in which it is held.

While these retractable captive fasteners provide improvements over the fixed or loose bolt design, they are still deficient. The retractable fastener may still be pushed back into the captivator during installation. This presents similar problems non-captive fasteners in that it may be difficult for a user to locate and/or access the retracted fastener. Additionally these captive fasteners require a single unit design and "off-the-shelf" fasteners cannot be used since they do not have appropriately slotted or notched heads. As such, these systems are relatively expensive and do not have any simple substitute fastener should the original fastener become fouled (e.g., bent, stripped, etc.) or lost during transit or installation.

Accordingly, flexible and cost-effective systems for fastening are required.

BRIEF SUMMARY OF THE INVENTION

The present invention relates generally to captive fasteners and more particularly to spring-loaded captive fasteners. A retainer for securing a fastener has a housing that constrains motion of the fastener to be substantially along a direction of travel and an elastic member coupled to the housing at a first end that exerts force on the fastener substantially along the direction of travel.

In some embodiments, the retainer has a captive plate coupled to the housing that restrains the fastener in the housing. In the same or alternative embodiments, the housing is a substantially tube-shaped member with an interior portion that is substantially the same shape as a portion of the fastener.

These and other advantages of the invention will be apparent to those of ordinary skill in the art by reference to the following detailed description and the accompanying drawings.

DETAILED DESCRIPTION

In at least one embodiment of the present invention, a spring-loaded captive fastener retainer provides a user-friendly system to mechanically fasten units (e.g., panels, cabinets, etc.) to other units. Generally, the retainer is spring-loaded to force a fastener to extend beyond the unit. The retainer also provides guidance to the fastener so that it is secured within the unit and travels in a predictable path. In this way, it is easier for a user to manipulate and/or guide the fastener to contact and/or interlock with another unit or device.

Figure 1:
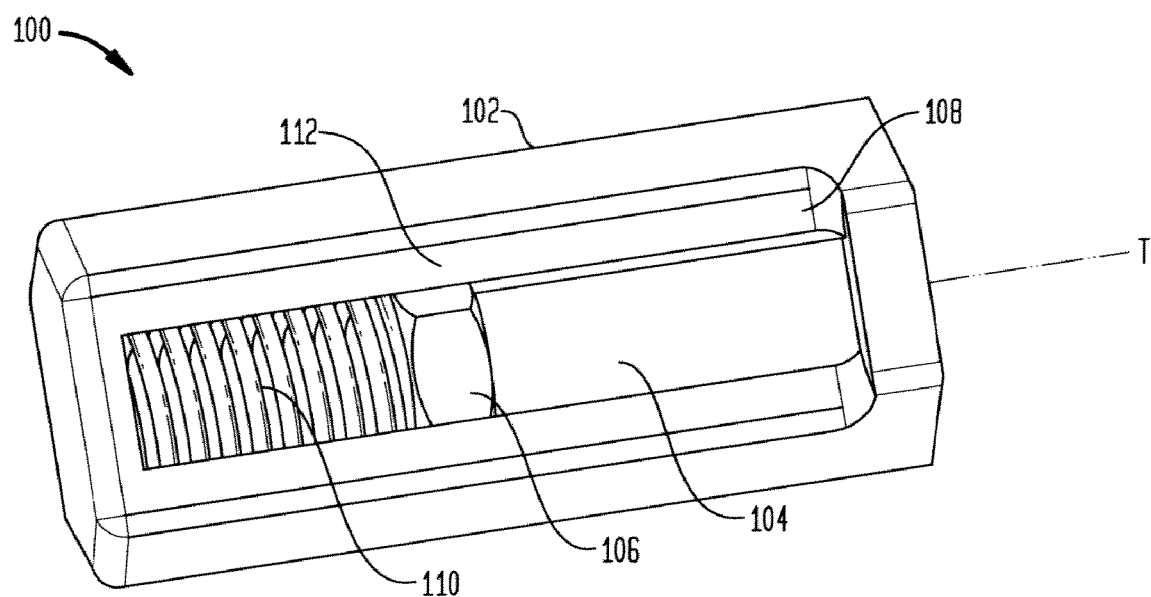
FIG. 1 depicts a back-top-side perspective view of a retainer according to an embodiment of the present invention.

FIG. 1 depicts a back-top-side perspective view of a retainer 100 according to an embodiment of the present invention. Retainer 100 has a housing 102 that partially or completely encloses a fastener 104, which may have a fastener head 106, such that fastener 104 is generally slidably aligned along a housing channel 108 in a travel direction T (e.g., a travel axis). Retainer 100 also includes an elastic member 110. In some embodiments, retainer 100 may also have one or more retainer openings 112.

Figure 2:
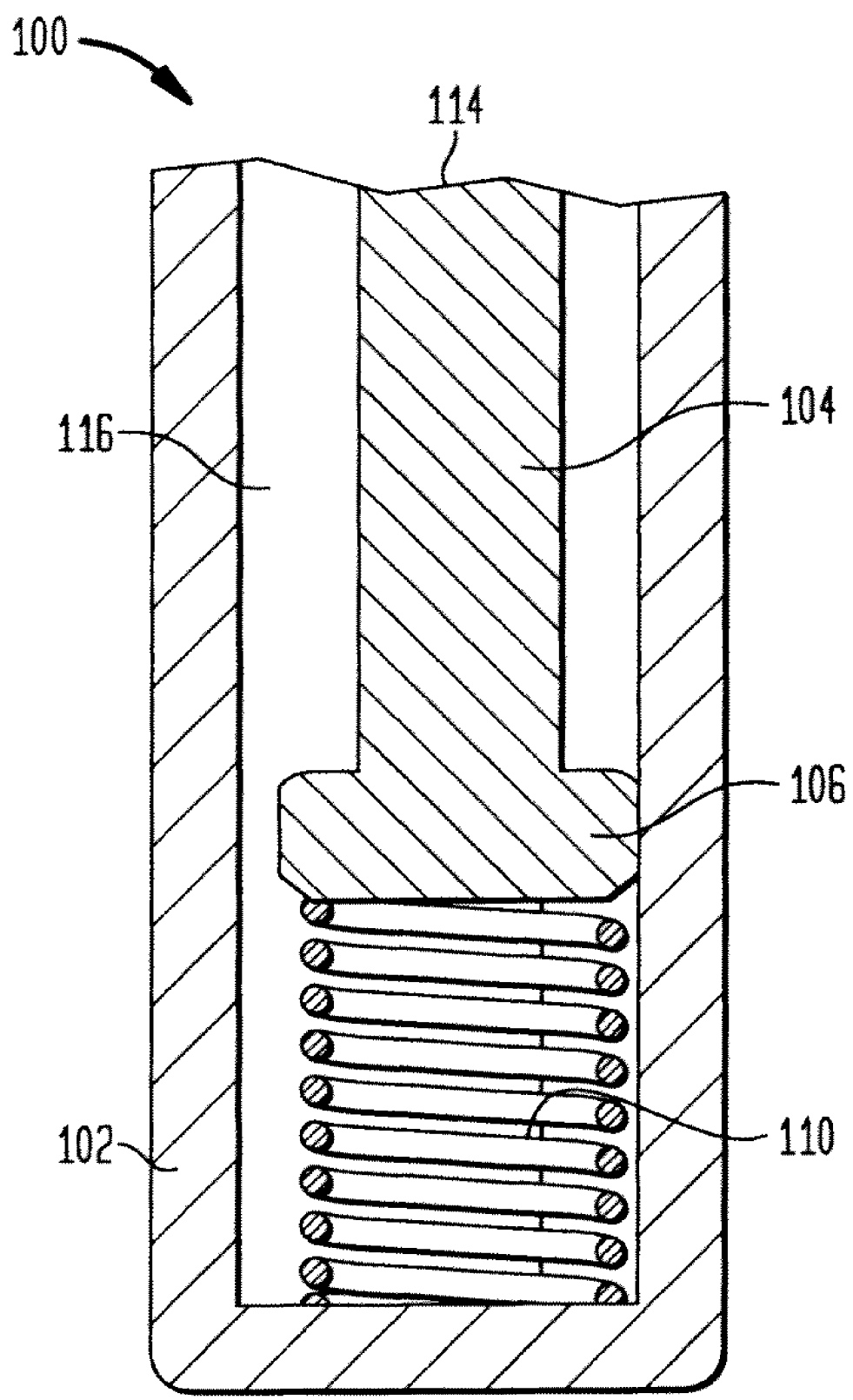
FIG. 2 depicts a top cross-sectional view of a retainer according to an embodiment of the present invention.

FIG. 2 depicts a top cross-sectional view of retainer 100 according to an embodiment of the present invention. As shown in FIG. 2, fastener 104 is situated in and is slidably disposed in housing channel 108 and may protrude from housing 102 at a housing opening 114 (e.g., at one end of housing 102). Since housing 102 is generally hollowed and has a central housing channel 108 aligned along its length, housing 102 has an interior surface 116.

Housing 102 is a captive housing. That is, it is formed (e.g., assembled, molded, manufactured, etc.) to hold fastener 104 captive. As such, the housing 102 may completely or partially surround the fastener 104. Accordingly, housing 102 may be a tube-shaped member or a similarly shaped member, such as a tube shape with one end capped, etc. It at least one embodiment, the interior surface 116 of housing 102 is shaped substantially similar to a preferred fastener head 106. For example, in practical applications usually using a standard hex head bolt (e.g., a fastener 104 with a fastener head 106 shaped as a hexagon), the interior surface 116 of housing 102 is also hexagonally shaped, with a slightly larger diameter than the preferred hex head bolt. In other words, the interior surface 116 of housing 102 may form a socket for the fastener 104 and/or the fastener head 106. In this way, fastener 104 is generally constrained in movement in every direction except along the travel direction T. Housing 102 may be formed of any appropriate material. In at least one embodiment housing 102 is formed of a non-conductive material.

Fastener 104 may be any appropriate fastener, such as a screw, bolt, lag bolt, hex head bolt, cap screw, or the like. In some embodiments, based on the interior dimensions of housing 102, off-the-shelf fasteners may be used as replaceable fasteners 104 and may be inserted into the interior space (e.g., aligned along travel direction T in housing channel 108) of housing 102. In alternative embodiments, fastener 104 is formed to fit housing channel 108.

Fastener 104 has a fastener head 106. In embodiments employing off-the-shelf fasteners, the fastener head may be a head portion of the fastener as is known. In embodiments in which fastener 104 is uniquely formed to fit housing channel 108, the fastener head may be formed to have substantially the same shape as the interior surface 116 of housing 102. In either case, an end of the fastener 104 (e.g., an end to be positioned at or near elastic member 110 in housing channel 108) may be considered as the fastener head 106 without regard to its manufacturing origin.

Elastic member 110 may be any appropriate elastic device. For example, elastic member 110 may be a spring of any type (e.g., compression spring, volute spring, coil spring, etc.). Elastic member 110 may be constructed of any appropriate material, such as metal wire, plastic, or the like. In at least one embodiment, elastic member 110 is a metal coil spring. Elastic member 110 may be a separate component of retainer 100 or, in some embodiments, may be a specially formed portion of housing 102. In embodiments in which elastic member 110 is a separate component of retainer 100, it may be affixed to (e.g., attached to, etc.) a portion of interior surface 116, such as at an end opposite housing opening 114. In alternative embodiments, elastic member 110 is positioned in housing channel 108, but is not affixed thereto. Elastic member 110 is aligned in housing channel 108 in such a manner as to provide a force against at least a portion of fastener head 106. That is, elastic member 110 may urge or push an end of fastener 104 toward housing opening 114. Elastic member 110 may be of sufficient length and/or provide sufficient force to cause at least a portion of fastener 104 to protrude from housing 102, but be elastic enough and/or short enough to allow sufficient compression such that the entirety of fastener 104 may also fit inside housing 102.

Retainer openings 112 may be cut-away (e.g., open, etc.) portions along housing 102. Retainer openings 112 may be included to allow a user to manipulate fastener 104, elastic member 110, or another portion of retainer 100.

Figure 3:
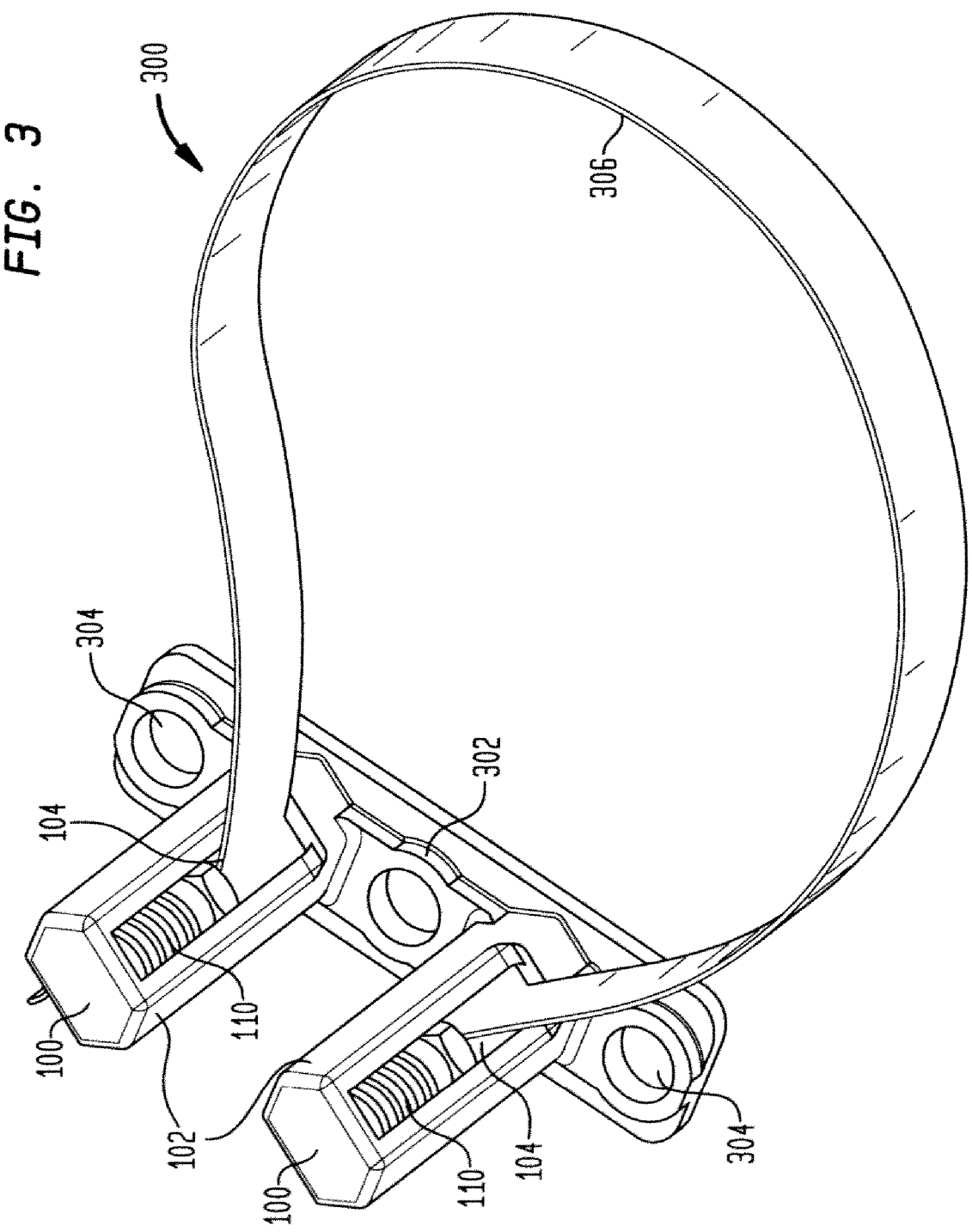
FIG. 3 depicts a back-top-side perspective view of a retainer system according to an embodiment of the present invention.

FIG. 3 depicts a back-top-side perspective view of a retainer system 300 according to an embodiment of the present invention. Retainer system 300 includes at least one retainer 100. Retainers 100 are coupled to a securing frame 302. Securing frame 302 includes one or more fastening points 304. In some embodiments, retainer system 300 includes one or more spacers 306.

Securing frame 302 may be formed of any appropriate material. In at least one embodiment, securing frame 302 is formed as a portion of housing 102 of retainer 100 as described above with respect to FIGS. 1 and 2. In alternative embodiments, securing frame 302 is secured to (e.g., attached to, etc.) housings 102 of retainers 100.

Fastening points 304 may be formed into and/or attached to securing frame 302. Fastening points 304 may be any appropriate component for allowing securing frame 302, and, by extension, retainers 100, to another object, such as panels 402 and 404 as described below with respect to FIGS. 4 and 5. For example, fastening points 304 may be screw holes, press-on tabs, glue, or the like.

Spacers 306 are stoppers removably placed in housing channel 108. That is, spacers 306 may be inserted into housing 102 and have some mechanism used by a user to remove the spacers 306 (e.g., a pull-tap, an exposed portion of spacers 306, a loop, a handle, etc.). In at least one embodiment, spacers 306 are placed in housing channel 108 through retainer openings 112 in such a way as to force fastener 104 away from opening 114. At least a portion of a spacers 306 is generally placed between an end of fastener 104 (e.g., the end opposite, along travel axis T, fastener head 106) and housing opening 114 to block the escape of fastener 104 from housing 102. Spacers 306 may be used in this manner during installation, transit, etc., and may be used in place of or in conjunction with retainer cover 408, discussed below with respect to FIG. 4. One or more spacers 306 may be used for each housing 102. For example, a single spacer 306 may be inserted into two housings 102 through housing openings 112 as shown in FIG. 3. Spacers 306 may be formed of any appropriate material such as an insulating material, Formex, plastic, ribbon, film, etc. In at least one embodiment, a spacer 306 is a ribbon of material having one portion inserted into the housing opening 112 of a first housing 102 and another portion inserted into the housing opening 112 of a second housing. Of course, any other appropriate materials and configurations, such as corks, wads, elastic members, etc. may be used as spacers 306.

Figure 4:
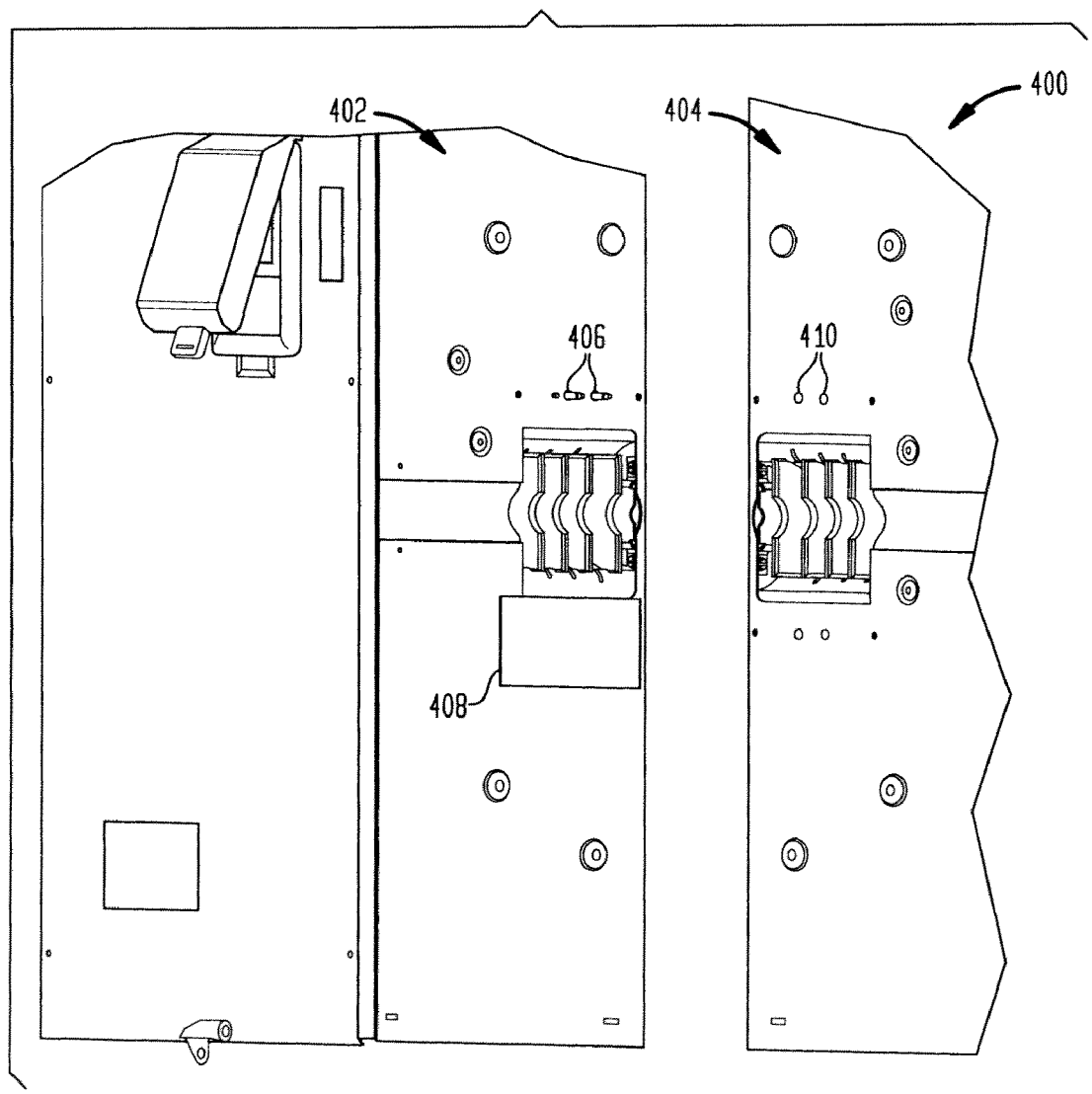
FIG. 4 depicts a panel assembly system.

FIG. 4 depicts a panel assembly system 400. Panel assembly system 400 represents a possible practical use of retainer 100 as will be described further below. Panel assembly system 400 includes a first panel 402 and a second panel 404. First panel 402 may be secured to second panel 404 using the inventive retainer 100.

Retainer 100 may be mounted to (e.g., attached to, secured to, etc.) the first panel 402 in such a way as to allow fastener 104 to protrude through the panel. Retainer 100 may be mounted using retainer system 300 as described above with respect to FIG. 3. In this way, a fastener 104 may extend out of housing 102 and pass through panel holes 406 of first panel 402. In some embodiments, a retainer cover 408 may be placed over panel holes 406 to prevent fastener 104 from protruding through the holes.

Panel 402 prevents fastener 104 from escaping the housing 102. To accomplish this, panel holes 406 may have a smaller interior diameter than at least a portion of fastener head 106, but a larger interior diameter than the remainder of fastener 104. In this way, at least a portion of fastener 104 may pass through the first panel 402 along travel direction T, but, since fastener head 106 is larger than the interior diameter of panel holes 406, the fastener cannot completely leave housing 102. Fastener 104 may thus be considered to be "semi-restrained" since only a portion of the fastener 104 (e.g., not the fastener head 106 portion) leaves housing 102.

Second panel 402 may also have panel holes 410 that may allow a fastener 104 to pass through. In this way, the fastener 104 passes through both panels 402 and 404 and provides a means to secure the panels together. In some embodiments, a nut or other fastener securing mechanism (not shown) may be attached to the protruding end of fastener 104 after it has passed through both panels 402 and 404. Since the retainer 100 is secured to one side of the first panel 402 (e.g., the "back" side) and the fastener 104 passes through both panels and the fastener securing mechanism secures the fastener on a far side of the second panel 404, the panels may thus be aligned and positioned together.

Figure 5:
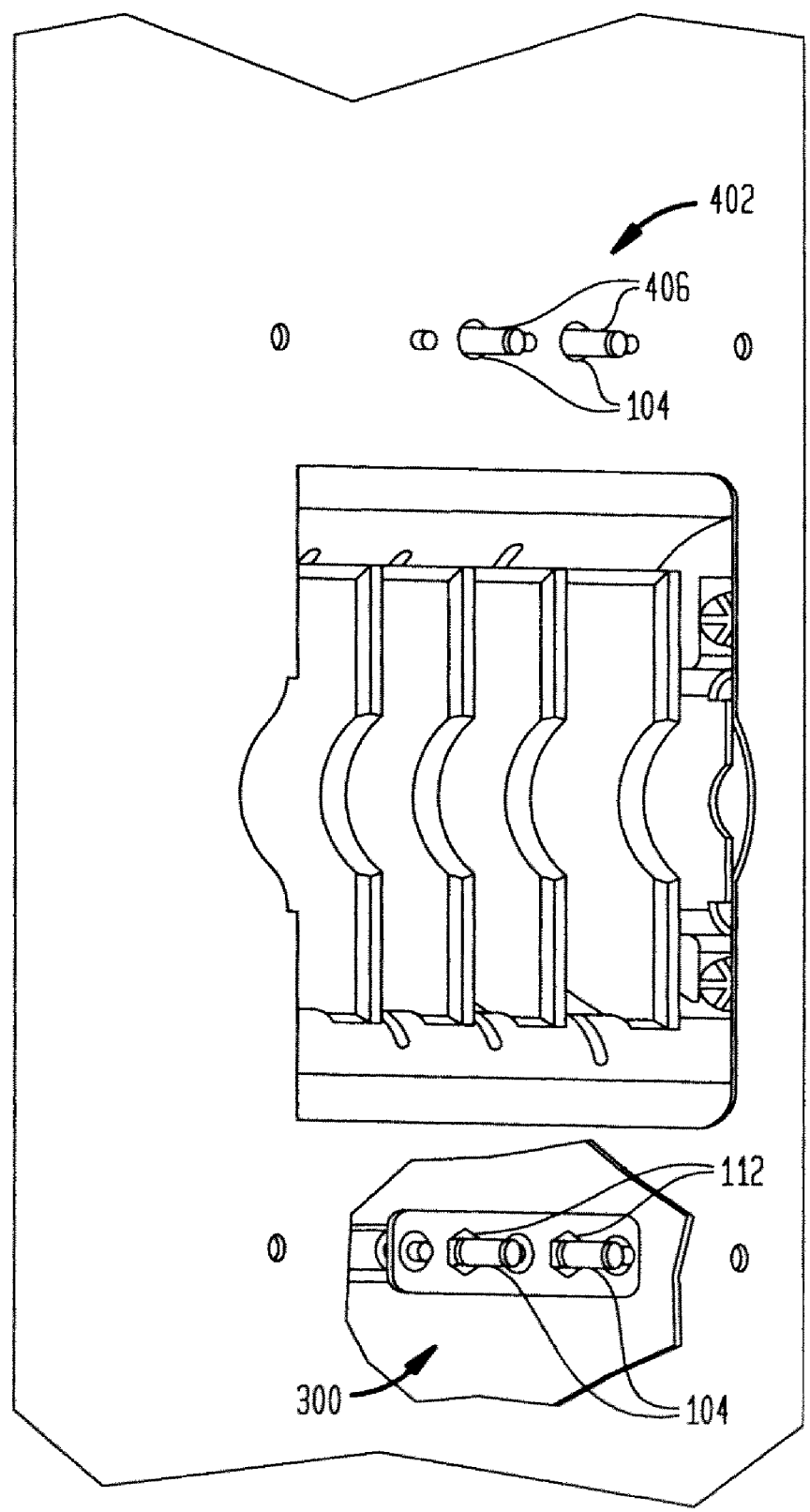
FIG. 5 depicts a close-up view of a panel assembly.

FIG. 5 depicts a close-up view of panel 402. As shown in cut-away portion 502, a retainer system 300 is secured to the "back" side of panel 402. Fasteners 104 extend out of housings 102 (e.g., elastic members 110 push fasteners 104 toward housing openings 112) and through the panel holes 406 of panel 402. These fasteners 104 may then extend through panel holes 410 of second panel 404 as described above with respect to FIG. 4.

In practical application, elastic member 110 is positioned inside housing 102 at an end opposite the housing opening 114. Fastener 104 is aligned in housing channel 108 along travel direction T (as shown in FIGS. 1 and 2) with the fastener head 106 positioned against elastic member 110. Fastener 104 is pushed (e.g., slid, etc.) into housing 102 such that elastic member 110 compresses. Retainer 100 is then attached, such as in a retainer system 300, to a first panel 402.

When fastener 104 is completely enclosed in housing 102, a retainer cover 408 is placed over fasteners 104 to hold them in housing channel 108. First panel 402 is positioned near second panel 404 by a user. The retainer cover 408 is removed and a portion of fasteners 104 are pushed by elastic members 110 through panel holes 406 such that they protrude through panel 402. The user then attempts to align fasteners 104 with panel holes 410 in second panel 404. If a mis-alignment occurs, the fasteners 104 are pushed back into the housing 102. That is, the fasteners 104 may push against a surface (e.g., panel 404) and are forced into housing 102. Elastic members 110 compresses to allow the fasteners 104 to slide back into the housings 102. When the force is removed (e.g., when the fasteners 104 are no longer pushed against a surface), the elastic members 110 exert a force on the fastener heads 106 and pushes a portion of fasteners 104 through housing openings 114. In this way, the panels 402 and 404 may be aligned without fear of breaking, bending, damaging, or otherwise distorting fasteners 104 as may occur in conventional fixed fastener set-ups. Similarly, because the fasteners 104 are spring-loaded by elastic members 110, the fasteners readily push back through panel holes 406 and are thus available to be aligned with holes 410 in panel 404. This is in contrast to the conventional captive fastener described above in that the conventional fastener is pushed back into its housing and must be retrieved manually by the user—a difficult and inconvenient problem during panel installation.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. An apparatus for securing fasteners each having an outer shape comprising:
    a securing frame;
    one or more fastening points coupled to the securing frame and configured to secure the fastener restraining system to a surface;
    a plurality of housings coupled to the securing frame, each housing having an interior shape adapted to correspond to the outer shape of an associated fastener to constrain rotational motion of each fastener about a first axis and to enable translational motion of each fastener substantially along the first axis for enabling rotation of a fastener securing element for securing each fastener;
    a captive plate coupled to the housing at a second end and configured to restrain the fasteners in the housings; and
    a plurality of elastic members coupled to the housings at a first end of each of the plurality of housings and configured to exert force on the fasteners substantially along the first axis.

2. The apparatus of claim 1 wherein the housings are substantially tube-shaped members.

3. The apparatus of claim 1 wherein at least one of the elastic members is a coil spring.

4. The apparatus of claim 1 further comprising:
    one or more spacers configured to restrain motion of the one or more fasteners along the first axis.

5. The apparatus of claim 4 wherein each housing comprises a retainer opening and the spacer is removably placed in the retainer opening.

6. The apparatus of claim 1 further comprising:
    the fasteners, wherein each fastener comprises a fastener head.

7. A captive housing assembly comprising:
    a securing frame;
    one or more fastening points coupled to the securing frame and configured to secure the captive housing assembly to a surface;
    a plurality of restraining enclosures each having a semi-restraining end;
    a fastener slidably disposed along an interior portion of each restraining enclosure and having a first end directed toward the semi-restraining end, wherein each restraining enclosure includes an interior shape adapted to correspond to an outer shape of the fastener to constrain rotational motion of the fastener about a first axis and to enable translational motion of the fastener substantially along the first axis for enabling rotation of a fastener securing element onto the first end for securing the fastener;
    a captive plate coupled to the surface and configured to restrain the fasteners in the restraining enclosures; and
    an elastic member arranged in the interior portion of the restraining enclosure at a second end of the fastener.

8. The captive housing assembly of claim 7 further comprising:
    a fastener restrainer arranged at the semi-restraining end of the restraining enclosure and configured to allow a portion of the fastener to pass therethrough.

9. The captive housing assembly of claim 7 further comprising:
    a fastener restrainer arranged at the semi-restraining end of the restraining enclosure and configured to prevent the fastener from passing therethrough.

10. A fastener restraining system comprising:
    a securing frame;
    one or more fastening points coupled to the securing frame and configured to secure the fastener restraining system to a surface;
    a plurality of housings coupled to the securing frame, each housing having an interior shape adapted to correspond to the outer shape of an associated fastener to constrain rotational motion of each fastener and to enable translational motion of each fastener substantially in a travel direction for enabling rotation of a fastener securing element onto each fastener for securing each fastener;

a captive plate coupled to the surface and configured to restrain the fasteners in the housings; and a plurality of elastic members coupled to the housings at a first end of each of the plurality of housings and configured to exert force on the fasteners substantially in the travel direction.

11. The fastener retainer system of claim 10 wherein the surface comprises one or more holes configured to allow one or more of the fasteners to pass therethrough.

12. The fastener retainer system of claim 10 wherein the housings are substantially tube-shaped members.

13. The fastener retainer system of claim 10 wherein interior portions of the housings have substantially the same shape as a portion of the fasteners.

14. The fastener retainer system of claim 10 wherein at least one of the elastic members is a coil spring.

15. The fastener retainer system of claim 10 further comprising:

one or more spacers configured to restrain motion of the one or more of the fasteners along the travel axis.

* * * * *